UNITED STATES PATENT OFFICE.

JOSEPH DEINET, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ANTHRACENE DYE.

No. 874,743.    Specification of Letters Patent.    Patented Dec. 24, 1907.

Application filed August 15, 1907. Serial No. 388,643.

*To all whom it may concern:*

Be it known that I, JOSEPH DEINET, citizen of the German Empire, residing at Elberfeld, Kingdom of Prussia, Germany, have invented new and useful Improvements in New Anthracene Dyes, of which the following is a specification.

My present invention relates to the production of a new dyestuff of the anthracene series from which a vat can be prepared and which dyes unmordanted cotton brown shades from such a vat.

The process for its production consists in treating a solution of anthraquinone in sulfuric acid with metals.

In carrying out my process practically I can proceed as follows, the parts being by weight: A mixture of 10 parts of anthraquinone, 7 parts of powdered copper and 200 parts of sulfuric acid (66° Bé), which mixture has to be continuously stirred, is slowly heated to 100—120° centigrade until the evolution of gas ceases. The melt is stirred into water and the precipitate is filtered off and washed.

My new dyestuff is a black paste scarcely soluble in organic solvents. It dissolves in concentrated sulfuric acid with a dull brown color. Upon treatment with an alkaline solution of hydrosulfite of sodium, it yields a dull-violet vat which dyes unmordanted cotton brown fast shades. Other metals can be used *e. g.* aluminium, silver etc.

Having now described my invention and in what manner the same is to be performed, what I claim as new and desire to secure by Letters Patent, is:—

The herein-described new dyestuff which can be obtained by treating a solution of anthraquinone in sulfuric acid with copper, which dyestuff is a black paste soluble in concentrated sulfuric acid with a dull brown color, and giving a dull-violet vat with hydrosulfite and caustic soda lye, which vat dyes unmordanted cotton brown shades, substantially as hereinbefore described.

In testimony whereof I have hereunto set my hand in the presence of two subscribing witnesses.

JOSEPH DEINET. [L. S.]

Witnesses:
  OTTO KÖNIG,
  WALTER GREEFF.